Patented Dec. 28, 1948

2,457,566

UNITED STATES PATENT OFFICE 2,457,566

REGENERATION OF ALUMINA ADSORBENTS BY OXIDATION

Knut A. Krieger, Philadelphia, and Heinz Heinemann, Upper Darby, Pa., assignors to Porocel Corporation, Philadelphia, Pa., a corporation of Delaware No Drawing. Application July 7, 1945, Serial No. 603,744

2 Claims. (Cl. 252—242)

The present invention relates to a method of regenerating spent adsorbents, particularly those which have been employed in the refining or conversion of hydrocarbons such as petroleum oils, waxes, gases, and the like.

An object of this invention is the regeneration of spent adsorbents containing adsorbed carbonaceous materials resulting from the treatment of hydrocarbon oils, and more particularly is this invention concerned with the regeneration of spent bauxite and spent activated alumina under conditions conducive to the preservation of useful life of such materials.

A further object of this invention is the regeneration of spent bauxite and spent activated alumina which has been used as a catalyst in the conversion of higher boiling hydrocarbon oils into motor fuel of the gasoline boiling range. However, it is to be understood that the method of this invention is also applicable in regeneration of spent bauxite and spent activated alumina which has been employed in the reforming of naphthas to increase their anti-knock value; or in the desulfurization or removal of gum and gum-forming constituents from hydrocarbon oils and gases; or in the isomerization, aromatization, alkylation, or polymerization of hydrocarbon oils or gases; or in various other uses in which these adsorbents become fouled with tarry or carbonaceous materials and thus lose their conversion or refining efficiency.

We have discovered that in the thermal regeneration of spent or partially spent alumina adsorbents under conditions conducive to the oxidation of adsorbed carbonaceous materials, the humidity or quantity of water in the regenerating gas, i. e., air or other free-oxygen containing gas, is an important factor in determining the extent of recovery of adsorbent activity upon repeated regeneration. More particularly, we have found that bauxite thermally regenerated in the presence of substantially dry air has a conversion or refining efficiency considerably greater than that of the original bauxite or of spent bauxite which has been regenerated in the presence of moist or humid air. We have further found the spent activated alumina, when thermally regenerated in the presence of substantially dry air, will exhibit a slower rate of decrease in conversion or refining efficiency than spent activated alumina thermally regenerated in the presence of moist air. The bauxite adsorbents referred to herein are commercially available materials generally prepared by crushing bauxite ore, drying the crushed ore to about 30% by weight water content, and thereafter grinding and screening the dried material to desired particle size. For many purposes, the bauxite thus prepared is thereafter activated by heating at a temperature between 600° F. and 1200° F. to obtain a residual volatile matter or water content (V. M.) within the range of 0.1% to 10% by weight. The activated alumina adsorbents, on the other hand, are usually prepared from aluminum trihydrate from the Bayer process, such alumina scale being washed, dried, crushed, screened, and thermally activated more or less in the same manner as bauxite. Activated alumina and bauxite, while not being equivalent for all purposes, both respond to the method of regeneration of our invention, particularly after use in the conversion or refining of hydrocarbon.

In accordance with the present invention, a spent alumina adsorbent containing adsorbed carbonaceous materials is subjected to regeneration by heating at an elevated temperature for a period of time sufficient to remove a substantial portion of the carbonaceous materials, the spent alumina being intimately contacted with substantially dry air or other free-oxygen containing gas during the heating step. By substantially "dry air" we mean air or other oxidizing gas having a moisture content of not more than 3 milligrams per liter of air when measured at 75° F. and 760 mm. pressure. Air or other oxidizing gas which has been dried by passing through a commercial dehumidifying or drying plant, and which has a moisture content not in excess of that above stated is suitable for our purpose. Such dehumidifying or moisture-absorbing plants may utilize agents such as activated alumina, activated bauxite, silica gel, calcium chloride, or copper sulfate for producing substantially dry air.

We prefer to carry out our regeneration of the spent alumina adsorbents at a temperature between 900° F. and 1400° F., very satisfactory results being obtained between 1050° F. and 1200° F., and in no case do we employ temperature so high as to cause sintering of the adsorbent particles. Dry gases other than air may be used in our regeneration, including oxygen, mixtures of air and oxygen or ozone, combustion or flue gases, and the like. The regeneration may be carried out by passing the spent alumina adsorbent through a heated tower or kiln concurrent or countercurrent to a stream of dry oxidizing gas, the gas charged to the tower or kiln having a moisture content not greater than 3 milligrams per liter of gas when measured at 75° F. and 760 mm. pressure. Alternatively, the spent alumina adsorbent may be regenerated in the same vessel in which it was used for converting or refining hydrocarbons, provided such vessel is equipped with suitable means for controlling or dissipating the heat of regeneration. In most cases it is desirable to remove from the spent alumina adsorbent a substantial portion of the adsorbed or mechanically held carbonaceous material such as oil, tar, or polymers, etc., prior to subjecting the alumina to thermal regeneration. This may be accomplished by purging the spent alumina with a non-oxidizing gas at temperatures preferably not high than about 900° F. Such gases include nitrogen, hydrogen, carbon monoxide, carbon dioxide, methane, ethane, and the like. When steam is used to purge the spent alumina, the temperature should be maintained below about 700° F. and the alumina, after purging, should be dried with air or other gas prior to raising the temperature to the level required for regeneration, i. e., 900° F. to 1400° F. If this is not done, the full benefit of our improved regeneration method will not be realized, since the presence of moisture has an adverse effect at regenerating temperatures. While it is generally more economic to effect purging with a non-oxidizing gas or with steam, such purging may also be effected by treating the spent alumina adsorbent with solvents such as methyl alcohol, ethyl alcohol, isopropyl alcohol, acetone, methyl ethyl ketone, benzene, toluene, naphtha gasoline, pyridine, or mixtures of two or more thereof. The solvent purging may be carried out at ordinary or elevated temperatures below the decomposition temperature of the solvent, and residual solvent may be removed prior to thermal regeneration by sweeping the purged alumina adsorbent with air, inert gases, or steam. When steam is used, the adsorbent should be dried below 700° F. before regeneration with dry air at higher temperatures. It is to be understood, of course, that purging with nonoxidizing gases, steam, or solvents effects only a partial removal of adsorbed oils, tars, or carbonaceous materials, and that the thermal regeneration removes an additional quantity of such materials. The alumina adsorbent, after regeneration, may still contain small amounts of carbon since it is almost impossible to remove all carbonaceous material, and the small residual carbon content, for all practical purposes, has little or no influence upon the conversion or refining efficiency of the regenerated aumina adsorbent.

Our invention may be further illustrated by the following examples, which, however, are not to be construed as limiting the scope thereof.

An East Texas gas oil having an A. P. I. gravity of 37° and a distillation range of 450° F. to 720° F. was employed in the cracking runs reported below. The cracking was carried out by passing the oil through a preheater to raise the temperature of the oil to about 850° F. and the resulting oil and vapors were passed at atmospheric pressure through a bed of adsorptive alumina catalyst contained in a heated reaction vessel, the oil being charged at a rate of 1 volume per volume of catalyst per hour. The cracking temperature was maintained at 900° F. when bauxite was used and at 975° F. when activated alumina was used. The cracked products from the reaction vessel were fractionated and a 400° F. end point gasoline fraction was separated, the quantity of such fraction being indicative of the cracking efficiency of the catalyst. The quantity of gasoline obtained with fresh catalyst in the first cracking run was chosen to represent 100% efficiency, and the comparative increase or decrease in efficiency upon repeated use and regeneration is based upon this arbitrary initial value.

The bauxites employed were obtained from various sources. Sample 1 was a 9/14 mesh Arkansas bauxite having a moisture content of 28%, and which was heated in the reaction vessel in a stream of nitrogen at 900° F. for 1 hour prior to the introduction of the oil to be cracked. Sample 2 was a 9/14 mesh bauxite from Dutch Guiana which had been activated by heating at 900° F. to a moisture content of 6%. Sample 3 was another Arkansas 9/14 mesh bauxite which had been activated by heating at 900° F. to a moisture content of 6%. The activated alumina was produced by the Bayer process, and had a mesh size of 9/14 and a moisture content of 7% as purchased.

The above catalysts were repeatedly used for cracking and were repeatedly regenerated, using dry air (not more than 3 milligrams of water per liter at 75° F. and 760 mm. pressure) on one hand, and wet air (100% humidity at 75° F. or 22 milligrams of water per liter at 75° F. and 760 mm. pressure) on the other hand. After each cracking run was completed, the reaction vessel was flushed with nitrogen for 1 hour to purge the catalyst granules of oil vapors and a portion of the adsorbed carbonaceous materials, and the oxidizing gas was then passed through the vessel for 1 hour in intimate contact with the catalyst to oxidize and remove an additional quantity of carbonaceous materials, thereby regenerating the cracking activity of the catalyst. During the regeneration, the temperature was maintained at 1200° F. The temperature was then lowered to 900° F. or 975° F. and cracking was resumed.

The results obtained are given in the following table, the terms "dry air" and "wet air" being used for brevity and comprehending the definitions thereof above set forth.

| Catalyst | Bauxite #1 | | Bauxite #2 | | Bauxite #3 | | Act. Alumina | |
|---|---|---|---|---|---|---|---|---|
| Cracking Temp | 900° F. | | 900° F. | | 900° F. | | 975° F. | |
| Regenerating Temp | 1,200° F. | | 1,200° F. | | 1,200° F. | | 1,200° F. | |
| Regeneratong Air | dry | wet | dry | wet | dry | wet | dry | wet |
| Cracking Efficiency: | | | | | | | | |
| Fresh Catalyst | 100 | 100 | 100 | 100 | 100 | 100 | 100 | 100 |
| 1st Regeneration | 134 | 126 | 144 | 80 | 161 | 138 | 76 | 65 |
| 2nd Regeneration | 128 | 105 | 128 | 88 | 151 | 131 | 81 | 59 |
| 3rd Regeneration | 128 | 95 | 144 | 70 | 147 | 93 | 83 | 61 |

From the above data, it will be apparent that regeneration with "dry air" gives markedly improved results over regeneration with "wet air," and that the activities of the various catalysts differ considerably from one another. However, in all cases, the improvement in regeneration in accordance with the present invention is definitely established.

We claim:

1. A method of regenerating a spent alumina containing adsorbed carbonaceous materials, which comprises purging said spent alumina with steam to remove at least a portion of the carbonaceous materials, removing moisture resulting from the steaming of said purged alumina at a temperature not higher than 700° F., and then heating said purged alumina at a temperature between 900° F. and 1400° F. in a current of air carrying not more than 3 milligrams of water per liter of air measured at 75° F. and 760 mm. pressure for a period of time sufficient to remove an additional portion of said carbonaceous materials.

2. A method of regenerating spent bauxite containing adsorbed carbonaceous materials, which comprises purging said spent bauxite with steam to remove at least a portion of the carbonaceous materials, removing moisture resulting from the steaming of said purged bauxite at a temperature not higher than 700° F., and then heating said purged bauxite at a temperature between 1050° F. and 1200° F. in a current of air carrying not more than 3 milligrams of water per liter of air measured at 75° F. and 760 mm. pressure for a period of time sufficient to remove an additional portion of said carbonaceous materials.

KNUT A. KRIEGER.
HEINZ HEINEMANN.

REFERENCES CITED

The following references are of record in the file of this patent:

UNITED STATES PATENTS

| Number | Name | Date |
| --- | --- | --- |
| 2,215,304 | Voorhies, Jr. | Sept. 17, 1940 |
| 2,225,402 | Liedholm | Dec. 17, 1940 |
| 2,383,218 | Schulze | Aug. 21, 1945 |